United States Patent [19]

Failes

[11] Patent Number: 5,598,264
[45] Date of Patent: Jan. 28, 1997

[54] NOISE COMPENSATED INTERFEROMETRIC MEASURING DEVICE AND METHOD USING SIGNAL AND REFERENCE INTERFEROMETERS

[76] Inventor: Michael Failes, P.O. Box 262, Campbelleville, Ontario, Canada, L0P 1B0

[21] Appl. No.: 443,772

[22] Filed: May 18, 1995

[51] Int. Cl.⁶ ............................................. G01B 9/02
[52] U.S. Cl. .................................. 356/352; 356/357
[58] Field of Search .............................. 356/352, 357, 356/358; 372/29, 32

[56] References Cited

U.S. PATENT DOCUMENTS 4,738,527  4/1988  McBrien ............................ 356/352
5,208,819  5/1993  Huber .................................. 372/32
5,412,474  5/1995  Reasenberg et al. ............... 356/352

OTHER PUBLICATIONS

"Measurements of Ultrasmall Displacements", SPIE vol. 126, Jacobs, Aug. 1997, pp. 39–43.

Primary Examiner—Samuel A. Turner
Attorney, Agent, or Firm—Riches, McKenzie & Herbert

[57] ABSTRACT

A sensor and a method for using the sensor for precise measurement of displacement is disclosed. The sensor comprises a fringe tracking signal processing system which can be used with any type of interferometer to provide high resolution over a large dynamic range of motion. The signal processing is based on phase information from the interferometric signal and the sensor is not sensitive to amplitude changes.

18 Claims, 5 Drawing Sheets

NOISE COMPENSATED INTERFEROMETRIC MEASURING DEVICE AND METHOD USING SIGNAL AND REFERENCE INTERFEROMETERS

BACKGROUND OF THE INVENTION

1. Field of the Invention

The invention lies in the field of interferometric optical sensors and more particularly non contact sensors.

Recent developments in fiber optics have led to a number of applications that use fiber optic cables as a means of delivering light to interferometric transducers and fiber optic components to replace bulk optic components to transmit coherent light. Measurands such as temperature, vibration, pressure, and displacement have been demonstrated.

2. Prior Art

Many traditional bulk optic interferometers have been realized with equivalent fiber optic paths as well as systems that use fiber optics as the conduit for coherent light and external (extrinsic) interferometers. A number of non interferometric, amplitude modulation schemes have also been demonstrated. Cost is an important factor in all applications and fiber optics tends to be used only when there is a particular technical justification, such as immunity to electromagnetic interference, sensitivity and potential for multiplexing over long distances. Fringe counting and phase/quadrature signal processing for spatial fringes are well known as are homodyne demodulation systems for single temporal fringes. Laser diodes are commonly used as coherent sources as they are small and potentially low cost.

A disadvantage of laser diodes is that they are sensitive to external cavity feed back which is manifest as mode hopping and wavelength jitter. In the past, optical isolators have been used to prevent feed back, but optical isolators tend to be expensive. External mode locking using Fabry Perot cavities has been used to stabilize laser diodes but this makes wavelength modulation very difficult. In many cases the component count and cost of interferometric optical sensors is high. Many require complex demodulation techniques, have a large number of complex optical components and are expensive compared to traditional electromechanical sensors.

SUMMARY OF THE INVENTION

It is an object of this invention to overcome many of the disadvantages of the prior art by using a wavelength modulated, low cost laser diode, a detector that detects the light from a signal interferometer producing interference fringes and a fringe tracking servo that controls the laser central or base wavelength to maintain an integral number of fringes within the optical path of the signal interferometer. It is a further object of the invention to minimise the effect of laser wavelength jitter by using a second, noise measuring interferometer which measures noise in the laser diode, or any other source of coherent light for the interferometer, so that this noise component can be eliminated from the signal.

It is a further object of the invention to reduce laser mode hopping and wavelength jitter by use of laser diode current modulation to modulate the laser diode wavelength about a base or central wavelength at a modulation frequency, and, use of a noise measurement interferometer which is controlled by optical path length modulation to compensate for the laser diode wavelength changes caused by the signal, leaving only the laser noise.

It is a further object to reduce the effects of laser amplitude and polarization, allowing high sensitivity, wide band width, large dynamic range, low cost and elimination of optical isolators.

In one aspect the invention is comprised of a laser diode, emitting coherent light, that is launched into a port of a two by two port fiber optic beam splitter that delivers light to the signal interferometer, the light being returned from the signal interferometer as an interference signal incident on both a detector and said laser diode. The laser diode is modulated by current at a frequency of 100 kHz about a bias current corresponding to a mean or base wavelength, such that changes of the phase and amplitude of the interference signal from the signal interferometer are such that the laser diode does not mode lock to that part of the interference signal that is incident on it, called the optical feedback, and the laser diode shows greatly reduced tendency to mode hop or have wavelength jitter.

The relatively short coherence length of the laser diode coherent light compared to the fiber optic cable optical path length is also a factor in stabilisation as the distance from the laser to the signal interferometer can be long compared to the laser coherence length.

In a preferred embodiment, the signal interferometer is a Fizeau cavity comprising two reflectors. When coherent light is directed at the Fizeau cavity, as is known in the art, an interference signal is produced having a nominally sinusoidal interference signal intensity response, also referred to as fringes. The interference signal is a function of the wavelength of the coherent light and the optical path length, which in the case of a Fizeau cavity is double the separation of two reflectors along an axis perpendicular to the reflective surfaces.

The phase of a fringe in the interference signal is the means for the measurement of optical path length using a fringe tracking servo that maintains a fixed number of fringes within the optical path length by adjusting the wavelength of the laser by control of current. In a preferred embodiment, this is achieved by synchronous detection of the interference signal using a novel double sample and hold system followed by a differential amplifier and integrator. The current modulation is impressed upon the laser diode and set to an amplitude that causes the fringes to oscillate about a mean position by a fraction of a period. The mean position is chosen as the peak or trough of a particular fringe such that the ends of the oscillations are at symmetrical positions of the nominally sinusoidal fringe. The intensities at these symmetrical positions are sampled and held and the difference between alternate samples is taken as the servo error signal. An integrator follows the synchronous detection, feeding a servo control signal back to a voltage controlled laser diode current driver, closing the loop and forming an integrating servo. A bias is also provided for the laser diode current driver such that the integrator can work over the full positive to negative range allowed by the electronic power supplies. This arrangement provides automatic filtering of the fundamental and harmonics of the current modulation frequency. A large dynamic range is provided by a wavelength step change to a different order fringe when the servo reaches an upper or lower limit, by means of reset pulses.

Given the physical path length separating the interferometer reflectors as an initial value, the reset pulses can be accumulated to represent the movement of one reflector with respect to the other in discrete steps. A fraction of a discrete step is represented by an analog signal proportional to the servo control signal. The sum of the initial value, number of discrete steps and fraction of a step is the measurement of the optical path length.

A second optical path delivers the laser light to a piezoelectrically driven second Fizeau interferometer, termed the noise measuring interferometer, which has an optical path length controlled by motion of a mirror driven by a piezoelectric positioning device. A second fringe tracking servo is used with additional feedback from the first signal fringe tracking servo described above, as a means of removing signal information from the noise measuring interferometer. Thus, the interference signal from this noise measuring interferometer is then only the noise associated with wavelength jitter of the laser diode.

Accordingly, in one of its aspects the present invention provides in an interferometric device having an optical path length and operable to produce an interference signal from coherent light emitted from a coherent light emitter means at wavelengths, wherein said interference signal comprises fringes and is a function of the wavelength of the coherent light and the optical path length, a measuring device for measuring the optical path length comprising: coherent emitter control means for controlling the wavelength of the coherent light in response to a control signal; optical detector means for detecting said interference signal and sending a detection signal indicative of a phase of a fringe in said interference signal; fringe tracking means for tracking a fringe of said interference signal and operable to receive the detection signal from the optical detection means and send the control signal to the coherent light emitter control means; wherein as the optical path length changes, the fringe tracking means sends the control signal to the coherent emitter control means to change the wavelength of the coherent light to maintain the detection signal indicative of the phase of the fringe; and wherein the control signal is indicative of the optical path length.

In a further aspect, the present invention further provides in an interferometric device having an optical path length and operable to produce an interference signal from coherent light emitted from a laser emitter means at wavelengths, wherein said interference signal comprises fringes and is responsive to changes in the wavelength of the coherent light and to changes in the optical path length, a method for measuring changes in the optical path length comprising the steps of: detecting a fringe of the interference signal with an optical detector means; tracking the fringe with the optical detector means while an axial displacement occurs by changing the wavelength of the coherent light so that the optical detector means continues to detect the fringe; measuring the change in the wavelength of the coherent light which was required to track the fringe; wherein the change in the wavelength is indicative of changes in the optical path length.

In a still further aspect, the present invention provides in an interferometric device having an optical path length and operable to produce an interference signal from coherent light emitted from a coherent light emitter means at wavelengths, wherein said interference signal comprises fringes and is a function of the wavelength of the coherent light and the optical path length, a measuring device for measuring the optical path length comprising control means for controlling the interference signal in response to a control signal, optical detector means for detecting said interference signal and sending a detection signal indicative of a phase of a fringe in said interference signal, fringe tracking means for tracking a fringe of said interference signal and operable to receive the detection signal from the optical detection means and send the control signal to the control means, wherein as the optical path length changes, the fringe tracking means sends the control signal to the control means to change the interference signal to maintain the detection signal indicative of the phase of the fringe, and wherein the control signal is indicative of the optical path length.

Further aspects of the invention will become apparent upon reading the following detailed description and the drawings which illustrate the invention and preferred embodiments of the invention.

BRIEF DESCRIPTION OF THE DRAWINGS

In the drawings, which illustrate embodiments of the invention.

DESCRIPTION OF THE PREFERRED EMBODIMENT OF THE INVENTION

Figure 1:
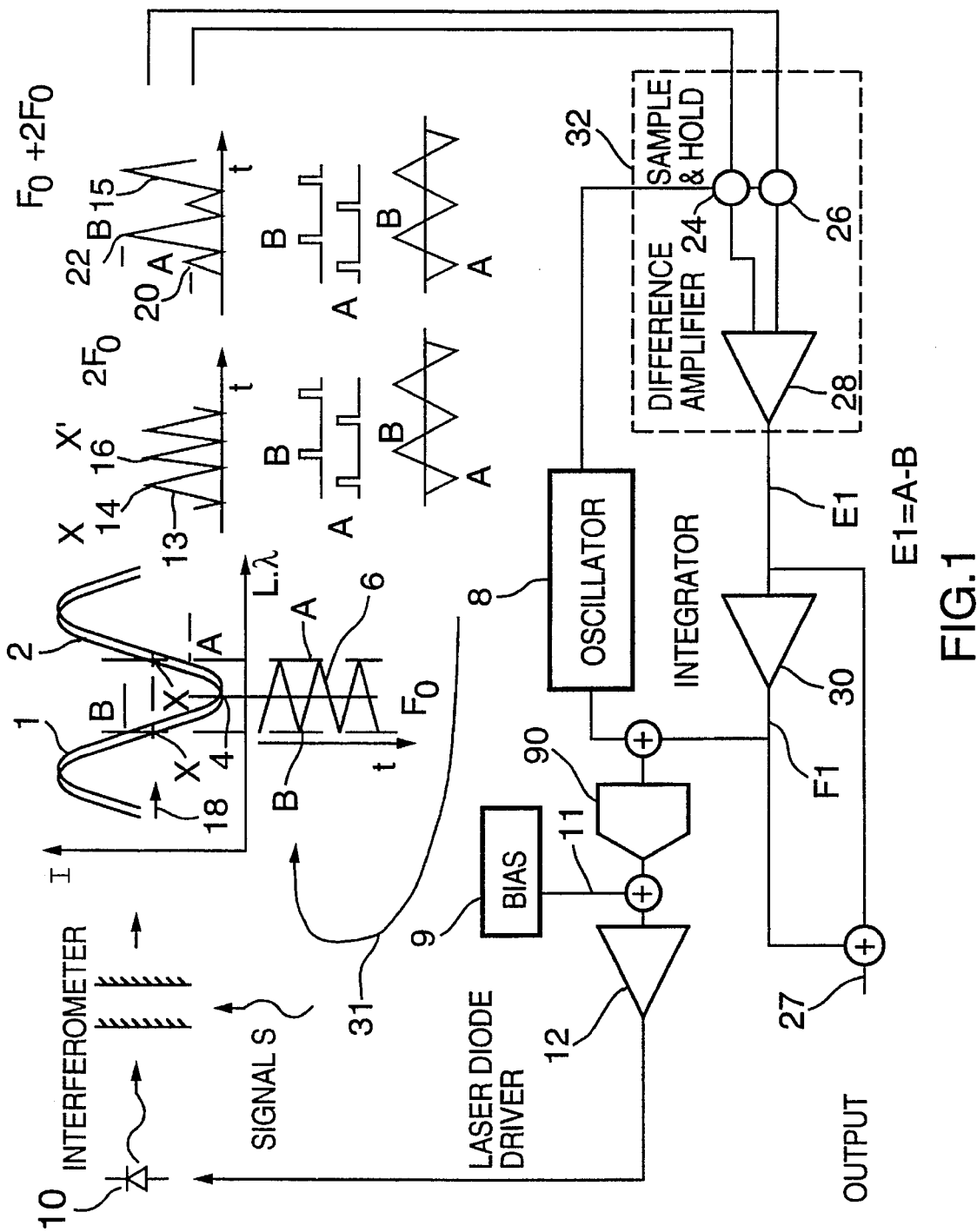
FIG. 1 shows the synchronous detection and servo loop arrangement according to one embodiment of the invention.

A fringe tracking servo based on a synchronous detection system will be described first. In a first preferred embodiment, as shown in FIG. 1, a general intensity output of a single spatial mode interferometer with respect to optical path length and wavelength is shown as sinusoidal waveform 1, also known as the fringes. The intensity axis is marked I and the optical path axis marked L, $\lambda$. Temporal axes of the waveforms are marked t.

In closed loop, the fringe tracking servo, shown generally in FIG. 1 as 31, has a mean operating point 4 at the minimum of a particular fringe 2. A voltage of frequency $F_0$, referred to as the modulation frequency, of nominally triangle waveform 6, is derived from an oscillator 8. Triangle waveform 6 is applied to laser diode 10, via a voltage controlled current driver 12, which converts the voltage modulation of the oscillator 8 into a current modulation. The current modulation modulates the wavelength of the laser diode 10 such that the fringes, and in particular fringe 2, is oscillatory about the operating point 4, resulting in an interference signal 13 having a component of frequency $2F_0$ with peak intensity heights 14 and 16 corresponding to the two opposite symmetric positions of fringe 2 marked X X'.

The amplitude of the modulation frequency is chosen to cause the position X and X' to be on the steepest part of the fringe slope at the half peak height; this is the quadrature position, a term usually associated with phase and quadrature detection. The fringe tracking servo is most sensitive when the quadrature positions are chosen for X and X' as shown in FIG. 1. as fringe motion gives the largest change in intensity at this point.

If the amplitude of the modulation frequency is reduced by a factor of two the positions of X and X' are separated by a quarter period of the fringe waveform which is the classical phase and quadrature distance. In this case the intensity as a function of fringe motion is reduced but there are advantages of reduced feedback to the laser diode. The signal to noise ratio of a particular device can be optimised by the setting of the amplitude of the modulating frequency.

The graphical representation of FIG. 1 shows fringe motion 18, due to changes in interferometer optical path length, which causes the peak heights 14 and 16 to increase and decrease to intensities 20 and 22 corresponding to fringe positions A, B. This results in the mixed frequency of $F_0$ and $2F_0$ in interference signal 15 which is detected by detector 60 (shown in FIG. 3). The detector 60 produces a detection signal $S_d$ in response to the intensity of the interference signal 15 which is received by the sample and hold circuits 24 and 26 of the synchronous sample and hold circuit 32.

The sample and hold circuits 24 and 26 operate on the peaks 20 and 22 on each cycle of the modulation frequency $F_0$. The difference between the peak heights (A–B) is obtained from a differential amplifier 28. This forms the synchronous sample and hold circuit 32, which produces servo error signal E1=(A–B). The servo error signal E1 is integrated by integrator 30 to give a servo control signal F1. The servo control signal F1 is summed with the oscillator 8, and applied to the programmable gain amplifier 90, the output of which is applied to the voltage controlled current driver 12 along with a bias voltage 11, from bias control 9. This causes the laser diode 10 to adjust wavelength about the central or base wavelength determined by the bias voltage 11, such that the fringe 2 is driven to be symmetrical about the operating point 4 at X, X'. This is the particular condition that A=B, where the servo error signal E1 is reduced to zero. The oscillator 8, amplifier 90, bias 9, and laser diode driver 12 form a coherent emitter control which controls the wavelength of the coherent light emitted by the laser diode 10 in response to control signal F1 from the integrator 30. This completes the servo loop. The servo control signal F1 and the servo error signal E1, have the double frequency $2F_0$ and fundamental $F_0$ automatically filtered by the sample and hold circuits 24 and 26.

The signal S is obtained as the output 27, as the sum of the servo error signal E1 and servo control signal F1, said error signal E1 having the high frequency content and said servo control signal F1 having the low frequency content with a mid frequency crossover. The low frequency component of the signal is therefore tracked and appears in the servo control signal F1. The high frequency components are not tracked and appear in the servo error signal E1. The signal S is there by given by the equation:

$$S=E1+\int E1dt \qquad [1]$$

In general the servo gain is selected such that the servo is critically damped or just overdamped to maintain stability and maintain lock on signals within the frequency response of said signal interferometer, which is the limiting factor for frequency response.

The aforesaid embodiment comprises a system that does not take into consideration noise that is produced as a result of laser wavelength jitter. In many applications of this embodiment where low frequency signals are tracked, the noise is substantially eliminated, as the error signal E1 is forced by the servo to be very near zero and the output signal is predominantly the control signal F1, which is an integrated signal having a low band width.

For higher frequency operation it is desirable to remove the noise using a second noise measuring interferometer. This allows the noise to be subtracted from the output signal.

Figure 2:
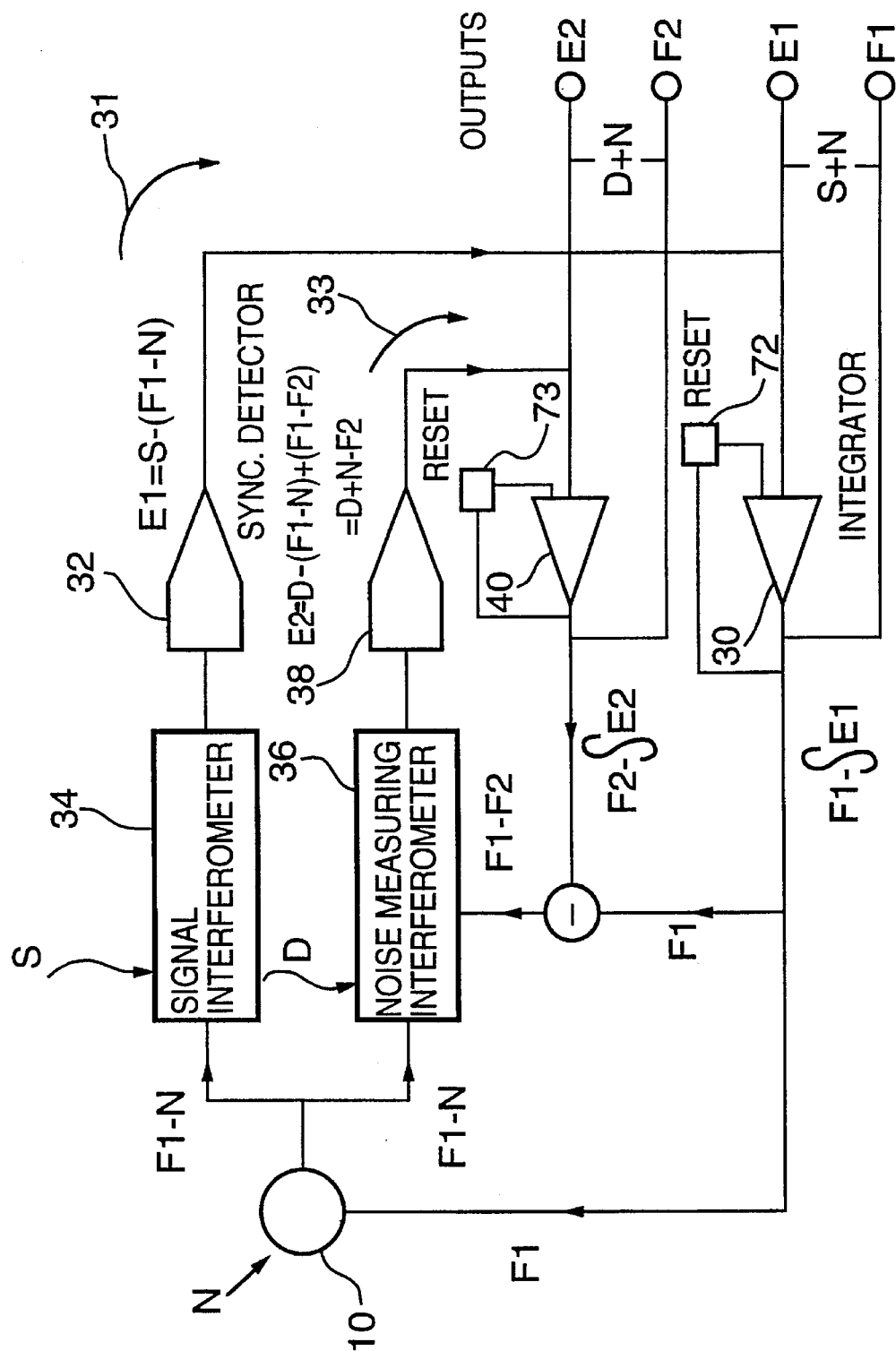
FIG. 2 is a schematic representation of the signal interferometer servo and the noise interferometer servo.

FIG. 2 shows a further preferred embodiment of the present invention utilizing the signal interferometer 34 in conjunction with a noise measuring interferometer, shown generally as 36, which is used to measure noise N generated by the laser diode 10. The dual operation of signal and noise measuring interferometers, 34 and 36, will now be described. A first closed loop fringe tracking servo, shown generally as 31, used to track fringes in the signal interferometer 34, comprises a synchronous detector 32, integrator 30 and laser diode 10. A typical input signal to the interferometer is shown as S, and a noise component from the laser diode 10 is shown as an input N. The servo error signal from the synchronous detector 32 is shown as E1 and the integrator 30 has an output servo control signal $F1=\int E1dt$. Outputs of E1 and F1 are combined with respect to appropriate sign, to give the sum:

$$S+N=E1+\int E1dt \qquad (2)$$

The noise measuring interferometer 36, is illuminated by the same laser diode 10 used to illuminate the signal interferometer 34. A second closed loop fringe tracking servo, also referred to as the noise fringe tracking servo and shown generally in FIG. 2 as 33, comprises a second synchronous detector 38 followed by a second integrator 40, which produces a second or noise servo control signal F2. The noise servo control signal F2 is subtracted from the servo control signal F1 and applied to the noise measuring interferometer 36 via a piezoelectric modulator that controls the optical path length to maintain a constant number of fringes within said noise measuring interferometer 36 by moving the reflective surface 68 (shown in FIG. 3).

By inspection it can be seen that the error signal E2 of the noise closed loop fringe tracking servo 33 is given by:

$$E2=D+N-F2 \qquad (3)$$

where D is a drift term representing any residual thermal changes in the noise measuring interferometer 36.

Outputs E2 and F2 are combined to give the sum:

$$D+N=E2+\int E2dt \qquad (4)$$

The difference is:

$$E1+\int E1dt-(E2+\int E2dt)=S-D \qquad (5)$$

and the noise is eliminated.

This arrangement of two interferometers one of which responds to the signal S and both of which respond to the noise N allows the subtraction of the noise N and recovery of the signal S. The drift term D is typically negligible as the second or noise interferometer 36 is typically included in the optical system in a control unit that is thermally and mechanically isolated.

Figure 3:
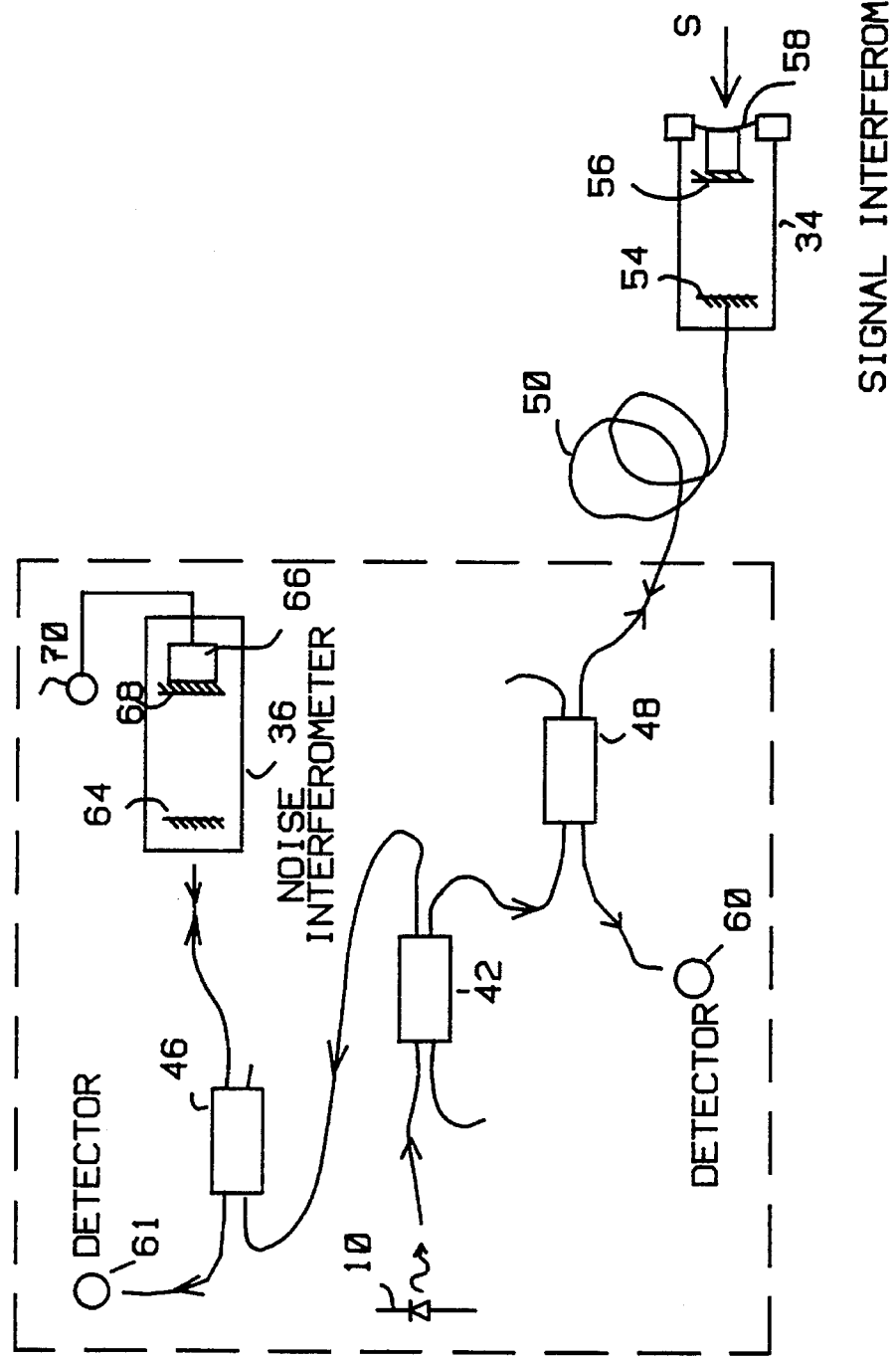
FIG. 3 is a diagram of the sensor according to one embodiment of the present invention.

FIG. 3 shows a diagram of the embodiment of the invention shown schematically in FIG. 2. FIG. 3 shows a thermally stabilised laser diode 10, pigtailed to a 3 dB fiber optic beam splitter 42, which in turn is connected to two similar fiber optic beam splitters 46 and 48. The output of beam splitter 48 is transmitted by a fiber optic cable 50 to the signal interferometer 34, which is constructed as a Fizeau cavity composed of a fixed partial reflector 54 and a movable reflector 56. Preferably, the fiber optic cable 50 has a length greater than the coherence length of laser diode 10 which further stabilizes the laser diode 10.

A signal S is shown for a typical pressure sensing application where a diaphragm 58 undergoes motion due to pressure and said motion is transmitted to reflector 56 to change the optical path length of the signal interferometer 34. The invention can be used for any measurand that affects a transducer to change optical path length such as displacement, temperature and vibration. It is understood that this measurand can be any physical phenomenon. The interference signal from the signal interferometer 34 is returned via the fiber optic cable 50 and is output to a photodetector 60. The signal interferometer 34 changes optical path length in response to an external signal S and the fringe tracking servo adjusts the laser wavelength to maintain a whole number of fringes within the cavity by constantly forcing the servo error signal E1 to become zero.

It is noted that the interference signal is also returned to the laser diode 10, via the same path as the light was initially transmitted. Generally, this would adversely affect the laser diode 10 in effect increasing noise and requiring an optical isolator. However, in the present invention, the need for an optical isolator is overcome by the arrangement as described above, and in particular modulation of the wavelength of the coherent light at the modulation frequency $F_o$.

The coherent light from the laser diode 10 is also directed by beam splitter 46 directed to the second or noise measuring interferometer 36. The noise measuring interferometer 36, in this embodiment is a Fizeau cavity and comprises a fixed partial reflector 64 and movable reflector 68 which is moved with respect to the fixed partial reflector by a piezoelectric element 66. The piezoelectric element 66 moves the movable reflector 68 along an axis perpendicular to the partially reflective surfaces so that the movable reflector 68 can change the optical path length of the noise measuring interferometer 36.

Interference signals from the noise measuring interferometer 36 are reflected back through beamsplitter 46 and are detected by a second or noise photodetector 61. The noise interferometer 36 is an optical path length controlled interferometer that allows the noise N to be determined. The noise interferometer 36 operates in a similar way to the signal interferometer 34 in that it is comprised of synchronous detection, integration and control means as shown in FIG. 2. However, the noise interferometer 36 differs from the signal interferometer 34 in that the servo control signal F2 of the noise interferometer 36 is received by a piezo driver 70 which controls the piezoelectric element 66 thereby controlling the optical path length of the noise interferometer 36 to maintain a constant number of fringes in the noise interferometer 36 in response to the changes of the wavelength of the coherent light from diode 10 which have occurred due to the signal S being sensed by the signal interferometer 34. FIG. 2 shows the signal paths of the means of feedback and control for the signal and noise interferometers shown in FIG. 3.

Laser diode 10 has a monotonic wavelength vs. current characteristic between mode hops and the integrator 30 has assigned upper and lower limits determined by the mode hop current thresholds at any given laser diode temperature. Referring again to FIG. 2, a reset circuit 72, senses the limit of the integrator 30 and resets the output to a new voltage level that shifts the laser diode wavelength by an incremental step that results in a new fringe. For example, referring to FIG. 5, the optical path length 140 may begin by containing J fringes of wavelength $\lambda_1$ after having acquired servo lock, after turn on or after a reset. This is termed operating on the Jth order fringe. The cavity may become elongated, thereby increasing the optical path length 142, such that the wavelength increases to $\lambda_2$ to compensate, holding the Jth order fringe (See FIG. 5). When the integrator runs out of range and undergoes a reset, the wavelength will return to $\lambda_1$ but the longer cavity 144 will instantaneously hold more than J fringes.

Figure 5:
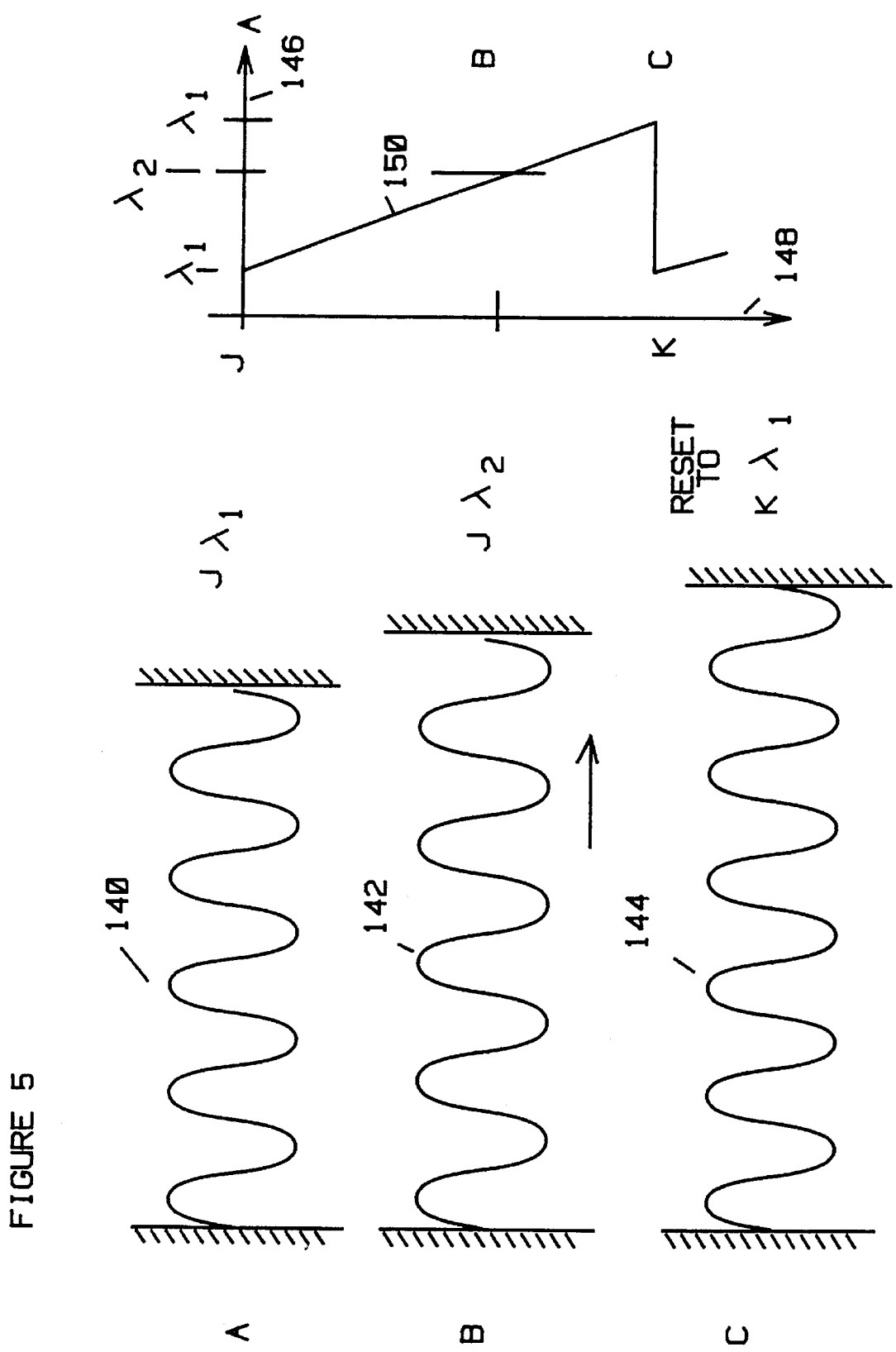
FIG. 5 is a schematic representation of fringes.

The limit of the integrator 30 and the reset voltage level can be adjusted so that a reset results in the displacement of a whole number of fringes such that the servo simultaneously aquires lock on the new Kth order fringe, wavelength $\lambda_1$. This allows accurate interpolation of fractions of a fringe from the servo error and servo control signals and fringe counting over a large dynamic range as K-J is a constant integer. FIG. 5 shows a representation with axis 146 corresponding to wavelength and axis 148 corresponding to number of fringes, has the elongation of the cavity shown as the line 150 at J fringes as the wavelength increases. After the reset the line returns to $\lambda_1$ at K fringes. Where accurate measurement of optical path length is not important in such applications as vibration sensing where only small local displacements of a diaphragmare sensed, the limit of the integrator 30 and the reset voltage level can be adjusted to give a larger reset range within the mode hop characteristics of the laser diode 10, such that resets are less frequent.

Figure 4:
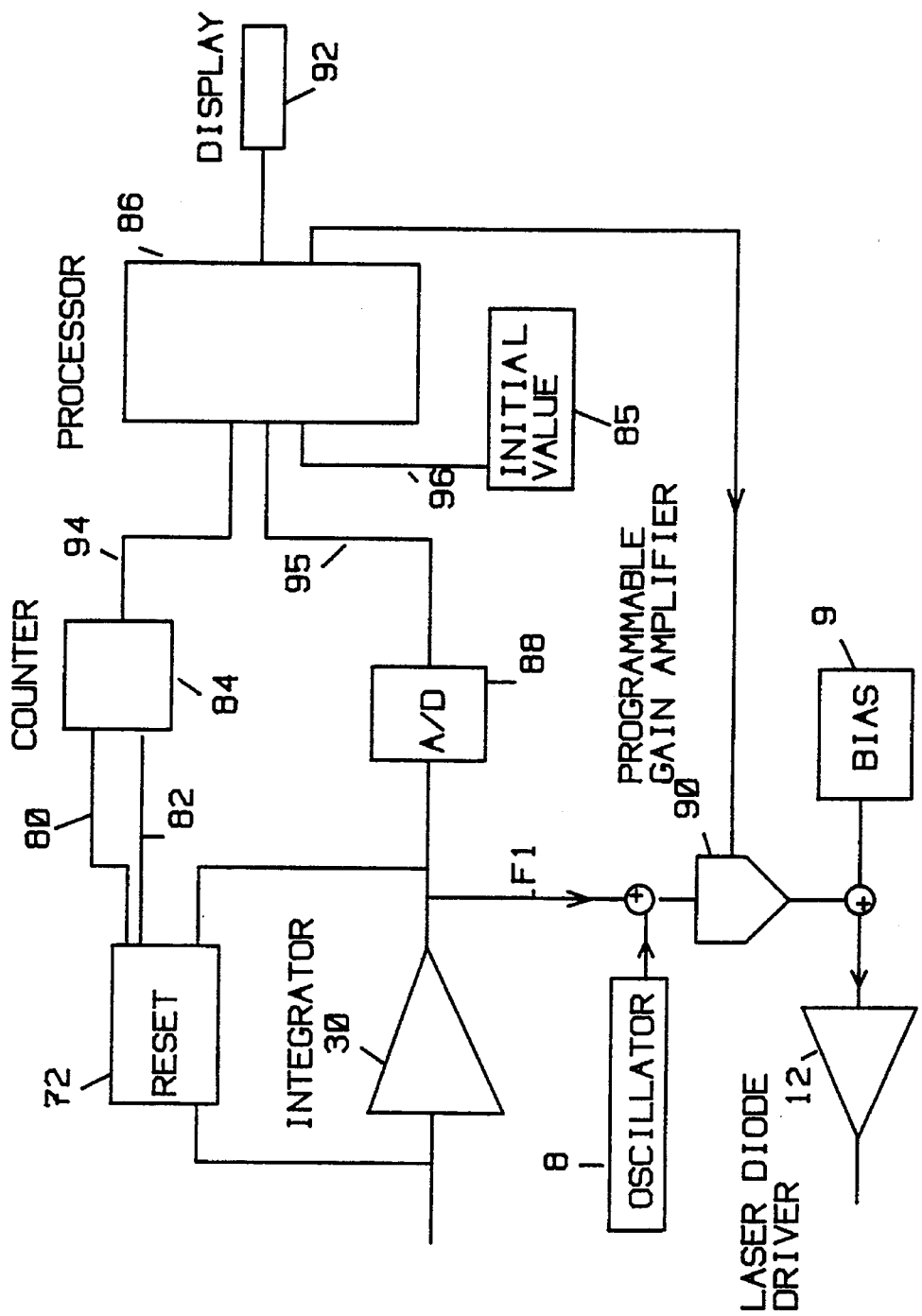
FIG. 4 is a schematic representation of the sensor signal processing and display.

Referring to FIGS. 2 and 4, reset circuit 72 generates a pulse on line 80 which is input to an up/down counter circuit 84 corresponding to a reset of integrator 30. Reset circuit 72 also generates a logic level on line 82, determined by the direction of motion, which is also input to the up/down counter circuit 84. The count is input to a processor 86 via electrical data bus 94. The output voltage from integrator 30 is input to an A/D converter 88, which generates a digital representation of the fractional part of the motion between resets. The output from the A/D converter 88 is input to processor 86 via data bus 95. An input circuit 85 allows the device user to input an initial value via data bus 96. The processor 86 performs a summation and applies a scaling factor, to display the optical path length in appropriate units, such as microns, on display 92 or for further processing.

Referring to FIGS. 1 and 4 the programmable amplifier 90 is controlled by a signal proportional to the optical path length, derived from processor 86. This is to reduce the servo control signal F1 and oscillator amplitudes as the optical path increases, as a proportionately smaller laser diode current change is required as the number of fringes within the optical path increases. For example, an interferometer has an optical path length that contains J fringes and will reset at (J±1) for a current change of DI. An interferometer having 2J fringes within its optical path length will reset at (2J±1) fringes, however the current change required is DI/2.

It is understood that the invention is not limited to the use of a Fizeau cavity as the signal interferometer or noise measuring interferometer. Any interferometric configuration, including but not limited to the Michelson, Mach Zehnder, Sagnac and Fabry Perot can be used. The invention is also not limited to the measurement of displacement as optical path length is the product of refractive index and physical path length, therefore refractive index of the medium within the signal interferometer can be measured. It is also understood that the interferometer may be a remote sensing interferometer such that one of the mirrors is located remotely from the remainder of the interferometer and may even be the surface of a remotely located object.

It is further understood that the invention is not limited to the use of a laser diode as the coherent light source. Rather, any type of coherent emitter that has wavelength control may be used. Examples are fixed wavelength lasers followed by wavelength modulators such as Bragg cells, gas lasers where one mirror is piezoelectrically driven to change wavelength and variable filters that allow selection of narrow bands from within a broader band source.

The preferred embodiment of the invention has been disclosed as a fringe tracking servo 31 having a control signal F1 which is sent to a control means to maintain a constant number of fringes (or waves) within an optical path length, the control means being a coherent emitter control means which controls the wavelength of the laser diode 10 by controlling the current applied to the laser diode driver 12. It is understood that the invention is not limited to coherent emitter control means to control the wavelength of the coherent light emitted by the laser diode 10, but rather any control means which can control the interference signal can be used. For example, a control means to control the refractive index or the physical path length can be used. The piezoelectrically driven positioning device of the noise measuring interferometer, shown above, is one example of a control means which controls the physical path length. Another example of a control means is the effect of magnetic and electric fields on the refractive index of various materials which is well documented and is known in the art. In this latter case, the control means could control the optical path length by controlling the refractive index in response to the control signals.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. In an interferometric device having an optical path length and operable to produce an interference signal from coherent light emitted from a coherent light emitter means at wavelengths, wherein said interference signal comprises fringes and is a function of the wavelength of the coherent light and the optical path length, a measuring device for measuring the optical path length comprising:

control means for controlling the interference signal in response to a control signal;

optical detector means or detecting said interference signal and sending a detection signal indicative of a phase of a fringe in said interference signal;

fringe tracking means for tracking a fringe of said interference signal and operable to receive the detection signal from the optical detection means and send the control signal to the control means;

wherein as the optical path length changes, the fringe tracking means sends the control signal to the control means to change the interference signal to maintain the detection signal indicative of the phase of the fringe;

wherein the control signal is indicative of the optical path length;

modulating means for modulating the wavelength of the coherent emitter means about a base wavelength at a modulation frequency;

wherein said fringe tracking means comprises synchronous sample and hold means to periodically sample the detection signal at a frequency of twice the modulation frequency;

wherein the synchronous sample and hold means is synchronous with the modulating means and said sample and hold means samples and holds two sampled detection signals each cycle of the modulating means;

wherein the fringe tracking means comprises comparing means to compare the two sampled detection signals for each cycle of the modulating means and provide a difference signal for each cycle of the modulating means corresponding to a difference between the two sampled detection signals;

wherein the control signal corresponds to the difference signal for each cycle and causes the control means to change the interference signal in response thereto;

noise interferometer means for measuring noise in the coherent light emitter means, said noise interferometer means comprising;

a fixed partially reflective surface and a movable reflective surface;

motion means for moving said movable reflective surface relative to the fixed partially reflective surface in response to a movement signal:

light transmission means for transmitting the coherent light from the coherent light emitter means to the noise interferometer means, said noise interferometer means producing a noise interference signal in response thereto;

noise optical detector means for detecting the noise interference signal and operable to send a noise detection signal indicative of fringes in said noise interference signal; and noise fringe tracking means for tracking a noise fringe of said noise interference signal and operable to receive the noise detection signal from the noise optical detection means and send the movement signal to the motion means, said noise fringe tracking means comprising;

synchronous noise detection means to periodically detect the noise detection signal at a frequency about twice the modulation frequency, wherein said synchronous noise detection means is synchronous with the modulating means and said noise detection means detects and stores two noise detection signals each cycle of the modulating means;

comparing means to compare the two noise detection signals for each cycle of the modulating means and provide a noise difference signal for each cycle corresponding to a difference between the two, noise detection signals; and combining means for combining the difference signal with an inverse of the noise difference signal;

wherein the movement signal corresponds to a combination of the difference signal and the inverse of the noise difference signal; and wherein the noise difference signal is indicative of the noise in the laser emitter means.

2. The measuring device as defined in claim 1 further comprising:

means for determining an initial optical path length of the interferometric device;

addition means for adding the initial optical path length and changes in the optical path length as indicated by the control signal; and wherein the optical path length can be measured.

3. The measuring device as defined in claim 1 wherein the fringe tracking means further comprises integrating means to integrate the difference signal for each cycle with respect to time and provide an integrated difference signal; and wherein the control signal corresponds to the integrated difference signal; and wherein the difference signal and the integrated difference signal are indicative of the optical path length.

4. The measuring device as defined in claim 3 wherein the control means is a coherent light emitter control means which controls the wavelength of the coherent light emitted from the coherent light emitter means; and wherein the coherent light emitter control means controls the interference signal by changing the wavelength of the coherent light.

5. The measuring device as defined in claim 3 wherein the control means is a movement means which controls a physical path length of the optical path length; and wherein the movement means controls the interference signal by changing the physical path length of the optical path length.

6. The measuring device as defined in claim 4 wherein the control means is a refractive index control means which controls a refractive index of the optical path length; and wherein the refractive index control means controls the interference signal by changing the refractive index of the optical path length.

7. The measuring device as defined in claim 4 wherein the coherent light emitter means is a laser diode means which emits coherent light in response to an applied current, and, the wavelength of the coherent light is dependant on the applied current.

8. The measuring device as defined in claim 7 wherein the laser diode means has a coherence length;

wherein the coherent light from the laser diode means is transmitted a distance from the laser diode means to the interferometric device; and wherein the distance is greater than the coherence length.

9. The measuring device as defined in claim 8 wherein the coherent light emitted from the laser diode means is transmitted to the interferometric device by means of fiber optic cable means and the interference signal is transmitted from the interferometric device to the optical detector means by means of said fiber optic cable means.

10. The measuring device as defined in claim 3 wherein the coherent light emitter means is a laser diode means which emits coherent light in response to an applied current, and, the wavelength of the coherent light is dependant on the applied current;

wherein the laser diode means has a coherence length and the coherent light from the laser diode means is transmitted a distance from the laser diode means to the interferometric device which is greater than the coherence length; and wherein the coherent light emitted from the laser diode means is transmitted to the interferometric device by means of fiber optic cable means and the interference signal is transmitted from the interferometric device to the optical detector means by means of said fiber optic cable means.

11. The measuring device as defined in claim 4 wherein the coherent light emitter control means further comprises:

bias means for generating a bias signal sufficient for the laser diode means to emit coherent light and wherein the control signal from the integrating means and modulation signals from the modulating means are superimposed on the bias signal; and laser driver means to convert the bias signal superimposed with the control signal and modulation signals into the applied current.

12. The measuring device as defined in claim 8 further comprising reset means for resetting the laser diode means to a new base wavelength if a change in the optical path length has exceeded an operating range of the integrator means; and wherein the fringe tracking means tracks a phase of a new fringe of said interference signal after reset of the laser diode means;

wherein as the optical path length changes, the fringe tracking means sends the control signal to the laser diode means to change the wavelength to maintain the detection signal indicative of the phase of the new fringe; and wherein the control signal is indicative of the optical path length after reset of the laser diode means.

13. The measuring device as defined in claim 11 wherein the phase of the fringes of which the detection signal is indicative corresponds to a minimum intensity of said fringe.

14. The measuring device as defined in claim 1 wherein the interferometric device is a remote sensing interferometric device.

15. The measuring device as defined in claim 12 wherein the new base wavelength is the base wavelength.

16. In an interferometric device having an optical path length and operable to produce an interference signal from coherent light emitted from a coherent light emitter means at wavelengths, wherein said interference signal comprises fringes and is a function of the wavelength of the coherent light and the optical path length, a measuring device for measuring the optical path length comprising;

control means for controlling the interference signal in response to a control signal;

optical detector means for detecting said interference signal and sending a detection signal indicative of a phase of a fringe in said interference signal;

fringe tracking means for tracking a fringe of said interference signal and operable to receive the detection signal from the optical detection means and send the control signal to the control means;

wherein as the optical path length changes, the fringe tracking means sends the control signal to the control means to change the interference signal to maintain the detection signal indicative of the phase of the fringe;

wherein the control signal is indicative of the optical path length;

modulating means for modulating the wavelength of the coherent emitter means about a base wavelength at a modulation frequency;

wherein said fringe tracking means comprises synchronous sample and hold means to periodically sample the detection signal at a frequency of twice the modulation frequency;

wherein the synchronous sample and hold means is synchronous with the modulating means and said sample and hold means samples and holds two sampled detection signals each cycle of the modulating means;

wherein the fringe tracking means comprises comparing means to compare the two sampled detection signals for each cycle of the modulating means and provide a difference signal for each cycle of the modulating means corresponding to a difference between the two sampled detection signals:

wherein the control signal corresponds to the difference signal for each cycle and causes the control means to change the interference signal in response thereto;

wherein the fringe tracking means further comprises integrating means to integrate the difference signal for each cycle with respect to time and provide an integrated difference signal;

wherein the control signal corresponds to the integrated difference signal; and wherein the difference signal and the integrated difference signal are indicative of the optical path length, noise interferometer means for measuring noise in the coherent light emitter means, said noise interferometer means comprising:

a fixed partially reflective surface and a movable reflective surface;

motion means for moving said movable reflective surface relative to the fixed partially reflective surface in response to a movement signal;

light transmission means for transmitting the coherent light from the coherent light emitter means to the noise interferometer means, said noise interferometer means producing a noise interference signal in response thereto;

noise optical detector means for detecting the noise interference signal and operable to send a noise detection signal indicative of fringes in said noise interference signal; and noise fringe tracking means for tracking a noise fringe of said noise interference signal and operable to receive the noise detection signal from the noise optical detection means and send the movement signal to the motion means, said noise fringe tracking means comprising:

synchronous noise sample and hold means to periodically sample the noise detection signal at a frequency of twice the modulation frequency, wherein said synchronous noise sample and hold detection means is synchronous with the modulating means and said noise sample and hold means samples and holds two sampled noise detection signals each cycle of the modulating means;

comparing means to compare the two sampled noise detection signals for each cycle of the modulating means and provide a noise difference signal for each cycle corresponding to a difference between the two sampled noise detection signals;

noise integrating means to integrate the noise difference signal for each cycle with respect to time and provide an integrated noise difference signal; and combining means for combining the integrated difference signal with an inverse of the integrated noise difference signal;

wherein the movement signal corresponds to a combination of the difference signal and the inverse of the noise difference signal; and wherein the noise difference signal and the integrated noise difference signal is indicative of the noise in the laser emitter means.

17. In an interferometric device having an optical path length and operable to produce an interference signal from coherent light emitted from a coherent light emitter means at wavelengths, wherein said interference signal comprises fringes and is a function of the wavelength of the coherent light and the optical path length, a measuring device for measuring the optical path length comprising:

control means for controlling the interference signal in response to a control signal;

optical detector means for detecting said interference signal and sending a detection signal indicative of a phase of a fringe in said interference signal;

fringe tracking means for tracking a fringe of said interference signal and operable to receive the detection signal from the optical detection means and send the control signal to the control means;

wherein as the optical path length change, the fringe tracking means sends the control signal to the control means to change the interference signal to maintain the detection signal indicative of the phase of the fringe;

wherein the control signal is indicative of the optical path length;

modulating means for modulating the wavelength of the coherent emitter means about a base wavelength at a modulation frequency;

wherein said fringe tracking means comprises synchronous sample and hold means to periodically sample the detection signal at a frequency of twice the modulation frequency;

wherein the synchronous sample and hold means is synchronous with the modulating means and said sample and hold means samples and holds two sampled detection signals each cycle of the modulating means;

wherein the fringe tracking means comprises comparing means to compare the two sampled detection signals for each cycle of the modulating means and provide a difference signal for each cycle of the modulating means corresponding to a difference between the two sampled detection signals; and wherein the control signal corresponds to the difference signal for each cycle and causes the control means to change the interference signal in response thereto;

wherein the fringe tracking means further comprises integrating means to integrate the difference signal for each cycle with respect to time and provide an integrated difference signal;

wherein the control signal corresponds to the integrated difference signal; and wherein the difference signal and the integrated difference signal are indicative of the optical path length;

wherein the coherent light emitter means is a laser diode means which emits coherent light in response to an applied current and, the wavelength of the coherent light is dependant on the applied current;

wherein the laser diode means has a coherence length and the coherent light from the laser diode means is transmitted a distance from the laser diode means to the interferometric device which is greater than the coherence length; and wherein the coherent light emitted from the laser diode means is transmitted to the interferometric device by means of fiber optic cable means and the interference signal is transmitted from the interferometric device to the optical detector means by means of said fiber optic cable means;

noise interferometer means for measuring noise in the laser diode means, said interferometer comprising:

a fixed partially reflective surface and a movable reflective surface;

motion means for moving said movable reflective surface relative to the fixed partially reflective surface in response to a movement signal;

light transmission means for transmitting the coherent light from the laser diode means to the noise interferometer means, said noise interferometer means producing a noise interference signal in response thereto;

noise optical detector means for detecting the noise interference signal and operable to send a noise detection signal indicative of fringes in said noise interference signal; and noise fringe tracking means for tracking a noise fringe of said noise interference signal and operable to receive the noise detection signal from the noise optical detection means and send the movement signal to the motion means, said noise fringe tracking means comprising:

synchronous noise sample and hold means to periodically sample the noise detection signal at a frequency about twice the modulation frequency, wherein said synchronous noise sample and hold means is synchronous with the modulating means and said noise sample and hold means samples and holds two sampled noise detection signals each cycle of the modulating means;

comparing means to compare the two sampled noise detection signals for each cycle of the modulating means and provide a noise difference signal for each cycle corresponding to a difference between the two sampled noise detection signals;

noise integrating means to integrate the noise difference signal for each cycle with respect to time and provide an integrated noise difference signal; and combining means for combining the integrated difference signal with an inverse of the integrated noise difference signal;

wherein the movement signal corresponds to a combination of the difference signal and the inverse of the noise difference signal; and wherein the noise difference signal and the integrated noise difference signal is indicative of the noise in the laser diode means.

18. In an interferometric device having an optical path length and operable to produce an interference signal from coherent light emitted from a laser emitter means at wavelengths, wherein said interference signal comprises fringes and is responsive to changes in the wavelength of the coherent light and to changes in the optical path length, a method for measuring changes in the optical path length comprising the steps of:

detecting a fringe of the interference signal with an optical detector means;

tracking the fringe with the optical detector means while an axial displacement occurs by changing the wavelength of the coherent light so that the optical detector means continues to detect the fringe;

measuring the change in the wavelength of the coherent light which was required to track the fringe;

wherein the change in the wavelength is indicative of changes in the optical path length;

wherein the step of detecting a fringe comprises the steps of:

modulating the wavelength of the coherent light about a base wavelength at a modulation frequency;

synchronously detecting the interference signal at a frequency about twice the modulation frequency to produce two detection signals for each cycle of the modulation frequency; and comparing the two detection signals for each cycle of the modulation frequency to produce a difference signal corresponding to a difference between the two detection signals;

wherein the change in the wavelength required to track the fringe with the optical detector means is a function of the difference signal; and measuring noise in the laser emitter by the steps of:

transmitting the light from the laser emitter means to a noise interferometer means comprising a partially reflective surface and a reflective surface to produce a noise interference signal comprising fringes and being responsive to changes in the wavelength of the coherent light and to relative movement of the reflective surface with respect to the partially reflective surface;

synchronously detecting the noise interference signal at a frequency about twice the modulation frequency to produce two noise detection signals for each cycle of the modulation frequency;

comparing the two noise detection signals for each cycle of the modulation frequency to produce a noise difference signal corresponding to a difference between the two noise detection signals; and integrating the noise difference signal with respect to time to produce an integrated noise difference signal; and moving the reflective surface with respect to the partially reflective surface in response to a signal corresponding to the integrated difference signal minus the integrated noise difference signal;

wherein the noise difference signal and the integrated noise difference signal are indicative of the noise; and eliminating the noise from the laser emitter means by subtracting the noise difference signal and the integrated noise difference signal from the difference signal and the integrated difference signal.

* * * * *